July 3, 1956

G. F. THOMAS ET AL 2,753,445

HANGER FOR LIGHTING FIXTURE

Filed Sept. 6, 1952

INVENTORS.
GALE F. THOMAS
GUY T. BIXBY
BY THEIR ATTORNEYS.
HARRIS, KIECH, FOSTER & HARRIS
BY

United States Patent Office

2,753,445
Patented July 3, 1956

2,753,445

HANGER FOR LIGHTING FIXTURE

Gale F. Thomas, Inglewood, and Guy T. Bixby, Los Angeles, Calif., assignors to Smoot-Holman Company, Inglewood, Calif., a corporation of California Application September 6, 1952, Serial No. 308,248

5 Claims. (Cl. 240—78)

The present invention relates to lighting fixture hangers and more specifically to hangers having a mounting plate connected to an outlet box and having a stem depending from said mounting plate and wherein the stem is connected to the mounting plate by a swivel or movable connector. The stem supports on its opposite end a lamp socket adapter and in addition the stem serves as a conduit for the wires running from the power source to the lamp socket adapter.

In prior hangers for lighting fixtures of this general type, it was customary to attach the stem to the mounting plate by either screw means or by means of a pin inserted therethrough.

To thread the stem required the use of a stem formed of relatively heavy material, whereas inserting the pin through the stem obstructed the passage through which the wires are run. It is an important object of our invention to provide a stem which is crimped to the mounting plate and thereby avoid the obstruction of the wire passage and eliminate the necessity for using the heavier material as required when the screw means is employed. By the use of this means of attaching the stem to the mounting plate, expensive machine operations on the stem, such as threading, are eliminated. Also, mounting of the stem to the mounting plate is facilitated as compared to a construction which utilizes a pin inserted through the stem since there is no necessity for aligning the stem and the mounting plate.

In the prior art, where a ball and socket or swivel connector was used to mount the stem to the mounting plate, a limited movement of about 10° was all that was normally obtainable. Therefore, another object of the invention is to obtain a greater swivel of approximately 30°. More specifically, this greater arcuate movement is obtained through the use of a first member and a second member movably seated in said first member, said second member having elongated vertical slots through which a motion-limiting means is inserted.

It is common practice to provide a cover or canopy for the mounting assembly which serves to enhance the appearance of the hanger. In the prior art, the canopy was ordinarily connected to the mounting assembly by means of screws. This method entailed additional time and expense in installing a lighting hanger fixture. Therefore, it is a further object of the invention to provide a means of attaching the canopy to the mounting plate by the mere turning or twisting of the canopy into a locked position. This is accomplished by bayonet slot and pin means, the mounting plate having entry openings and cams juxtaposed with the entry openings and the canopy having cam followers insertable in the openings and coacting with the cams. Therefore, the canopy is attached by the mere insertion of the cam followers into the openings and the twisting of the canopy so as to permit the cam followers to engage the cams.

In the prior art lighting fixture hangers, the stem was usually attached to the lamp socket adapter by means of inserting a pin through the stem and stocket or by threading the stem so as to permit it to screw into the socket. By using the pin connection, the wire passageway became obstructed, whereas to thread the stem required the use of a heavier material for the stem. In addition, if during installation it becomes necessary to adjust the length of stem by cutting the excess stem, new threads must be added or holes provided for the insertion of the pin. Therefore, it is an important object of the invention to non-rotatably clamp the stem to the socket adapter without the use of pins or screw means, thereby avoiding the obstruction of the wire passageway and avoiding the need to thread the stem, permitting the use of a lighter material without undesirable sacrifice in strength. Furthermore, the whole fabrication process is simplified and the cost of both manufacturing and installation is reduced.

A husk or cover is generally provided to cover the lamp socket adapter, said husk serving to protect one from accidental contact with the electrical connections and giving a more attractive appearance. It is a further object of the invention to provide a means of securing the husk to the clamp and stem which prevents rotational movement of the husk. This is accomplished by providing the clamp with recesses which co-operate with projections or detents on the husk, and when said projections are inserted in the recesses, rotational movement of the husk is prevented.

Another object of the invention is to prevent vertical movement of the husk on the stem. Such vertical movement mars the stem, detracting from its appearance. This vertical movement is prevented by the use of a retainer cap, concentric with the clamp and engaging the clamp. The retainer cap, in addition, is seated against the husk.

The covering or husk often becomes very hot from the heat of the lamp and such heat is injurious to both the socket and electrical wires. It is an object of this invention to provide the inner surface of said husk with a coating which serves to absorb and dissipate the heat and thereby keep the socket and wires cooler.

The foregoing objects and advantages of our invention, together with other objects and advantages which will become evident, may be attained through the utilization of the exemplary embodiment of the invention which is illustrated in the accompanying drawing and which is described in detail hereinafter. Referring to the drawing.

Figure 1:
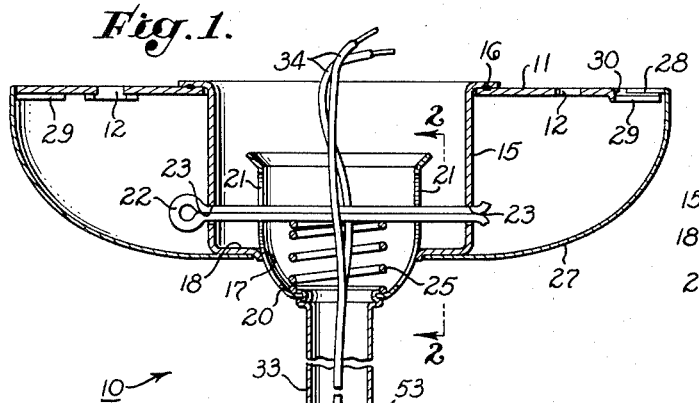
Fig. 1 is a vertical sectional view of the lighting fixture hanger taken along line 1—1 of Fig. 3.
Figure 2:
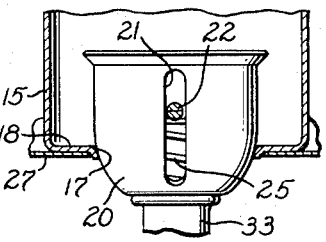
Fig. 2 is a fragmentary view, partly in section, taken along line 2—2 of Fig. 1.
Figure 3:
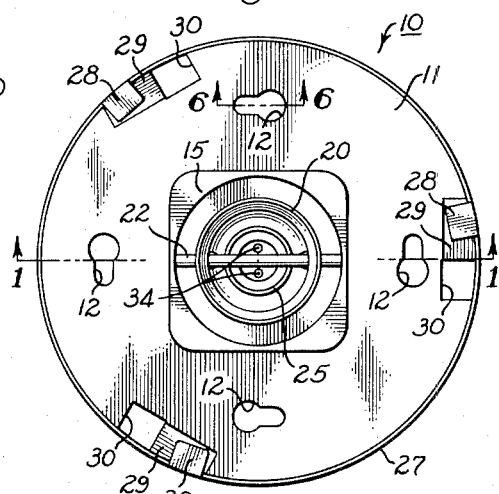
Fig. 3 is a plan view of an embodiment of our invention.
Figure 6:
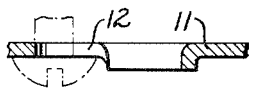
Fig. 6 is a fragmentary vertical sectional view taken along line 6—6 of Fig. 3.

Referring to the drawings, we show a lighting fixture hanger means 10, including a mounting plate 11 preferably formed of metal and having keyhole slots 12 (as best shown in Figs. 3 and 6) for mounting the plate 11 to a conventional outlet box, not shown. Supported by or connected to said mounting plate 11 is a box member 15 also preferably formed of metal and which as shown is welded to said mounting plate at 16 but not necessarily limited to such method of connection, and said box member may be formed integrally with said mounting plate. The box member 15 may be of any suitable configuration, but as shown is preferably cup-shaped, and has formed in its base 18 a circular opening 17 which serves as a seat for a bell-shaped aligning cup member 20 also preferably formed of metal. The box member 15 and aligning cup 20 co-operate similar to a ball and socket, permitting said aligning cup 20 to move within the opening 17. Greater movement is obtained by providing two oppositely faced, vertical, elongated slots 21 in the sides of the aligning cup 20, as best shown in Fig. 2, through which a motion-limiting means 22 is inserted to prevent horizontal rotational movement of said aligning cup 20 in said box member 15, but permitting swivel movement of said aligning cup relative to said box member, the motion-limiting means 22 preferably being a cotter key formed of electrically conductive metal which is secured in openings 23 in opposite sides of the box member 15. Tending to spring bias said aligning cup 20 downwardly in said box member 15 is a helical spring 25 having one end seated on the cotter key 22 and its other end seated on the base of said aligning cup. The helical spring 25 is compressed between the cotter key 22 and the aligning cup 20 so as to provide a resilient continuous electrical ground from the aligning cup through the cotter key to the box member 15, and this is a feature of the invention. It is also to be noted that the slot 21 in the aligning cup 20 cooperating with the cotter key 22 limits upward movement of the aligning cup, which is a further feature.

Acting as a cover for the above-described structure is a bell-shaped canopy 27 which is secured to the mounting plate 11 by means of cam followers 28, as best shown in Fig. 3. The cam followers 28 are inserted into entry openings 30 in the periphery of the mounting plate 11 and then rotated until the cam followers 28 co-operate with cams 29, which are juxtaposed with the entry openings 30 and integrally formed with the mounting plate 11, the cams and openings forming bayonet slot and pin means. By this means of securing the canopy 27 to the mounting plate 11, the need of screws is eliminated and the installation is both time-saving and less expensive.

Depending from the base of said aligning cup 20 is a hollow cylindrical stem 33 which acts as a conduit for electrical wires 34 from a source of power, not shown, to a lamp socket adapter 35. The stem 33 is rigidly and non-rotatably crimped to the lower end of said aligning cup 20, which projects below the opening 17 in the cup member 15. This manner of connection is an important object of the invention in that the wire passageway remains free from obstructions, thus enabling the running of the wires 34 more readily. In the prior art, it was possible to have an unobstructed passageway, but to do so required the threading of the stem. In this invention, no threads are required, as in the prior art, thereby permitting the use of a lighter metal for the stem 33 without a sacrifice in strength.

Figure 4:
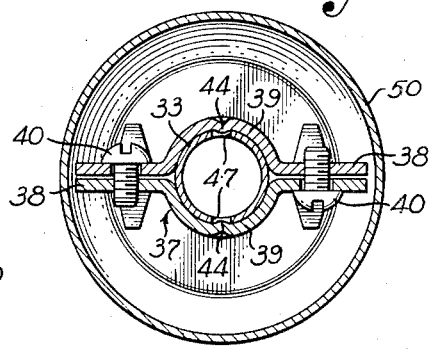
Fig. 4 is a horizontal sectional view taken along line 4—4 of Fig. 1, and showing the clamp means for connecting the stem to the socket adapter.
Figure 5:
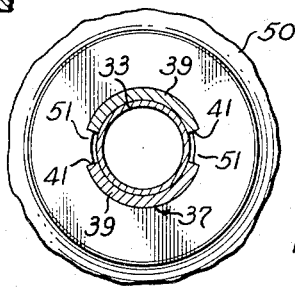
Fig. 5 is a horizontal sectional view taken along line 5—5 of Fig. 1, and showing the husk in operative relationship with the clamp.

The lamp socket 35 is connected to the lower end of the stem 33 by a split clamp 37 formed in two identical halves, each of which has vertical flanges 38 adapted to extend on each side of the stem, as shown in Fig. 4, and each of which has a semicylindrical center portion 39 adapted to clamp the stem 33 by means of screws 40 holding the vertical flanges together. The semicylindrical portions 39 are relieved at their edges above the vertical flanges 38 to provide vertical recesses 41 in the clamp above the flanges, for a purpose to be described hereinafter, and each of the vertical flanges 38 has a horizontal tab 42 bent out from its lower portion by which the clamp is rigidly secured to the lamp socket 35 by screws 43. To additionally index the lamp socket 35 relative to the stem 33 and to prevent relative movement therebetween, each of the semicylindrical portions 39 of the clamp is externally punched to provide an internal detent 44 adapted to fit into a hole or other recess 47 formed in the lower end of the stem 33. It is frequently desirable to shorten the stem 33 for particular installations. This may readily be done on the job with the subject invention by simply cutting off the lower end of the stem 33 to the desired length and drilling a single hole 47 therethrough to accommodate the detents 44, thus obviating any necessity of rethreading the lower end of the stem as has been required in prior art fixtures.

Providing a cover for the stocket 35 is a bell-shaped husk 50 mounted on the stem 33. The husk 50 is prevented from rotating relative to the stem 33 and socket 35 by means of ears 51 which fit into the recesses 41 in the clamp 37. The husk 50 is retained against vertical movement on the stem 33 by means of a retainer cap 53 and a washer 54. When the husk 50 is in position on the clamp 37, the retainer cap 53 fits tightly by a press fit over the upwardly projecting semicylindrical portions 39 of the clamp and is seated on the husk 50. This method of retaining the husk 50 relative to the socket 35 and stem 33 is a feature of the invention, as it holds the husk against sliding or rotation on the stem during shipment and handling and thus minimizes the danger of damage to the finish of the parts.

Figure 7:
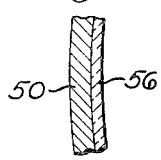
Fig. 7 is a fragmentary sectional view taken along line 7—7 of Fig. 1, showing the reflecting coating on the inner surface of the husk.

As shown in Fig. 7, the inner surface of the husk 50 is coated with a heat-absorbing and dissipating material 56, such as enamel porcelain or ceramic the purpose purpose being to dissipate the heat and thus keep the socket adapter 35 and wires 34 adequately cool.

Although we have disclosed an exemplary embodiment of our invention herein for purposes of illustration, it will be understood that various changes, modifications, and substitutions may be incorporated therein without necessarily departing from the spirit of the invention, and we hereby reserve the right to all such changes, modifications, and substitutions as properly come within the scope of the appended claims.

We claim as our invention:

1. In a lighting fixture, the combination of: (a) a mounting plate adapted to be attached relative to a ceiling; (b) a box member depending from said mounting plate and having a circular hole in the bottom thereof, said mounting plate and said box member providing a substantially continuous wall except for said hole; (c) a bell-shaped cup member supported in said hole and extending downwardly therethrough, said cup member having a circular hole in the bottom thereof; (d) swivel means for connecting said cup member to said box member and providing universal movement of said cup member relative to said box member; (e) a tubular stem rigidly secured to said cup member and depending therefrom, said stem being fixed in said hole of said cup member by an annular crimp connection; (f) lamp socket means; and (g) connecting means releasably secured to said lamp socket means and the lower end of said stem for rigidly securing the same together.

2. In a lighting fixture, the combination of: (a) a substantially flat mounting plate adapted to be attached relative to a ceiling and having a box member depending therefrom, the box member having a circular hole in the bottom, the mounting plate and box member providing a substantially continuous wall except for said hole; (b) a bell-shaped canopy adapted to be secured relative to said mounting plate so as to depend therefrom to enclose and cover said mounting plate and said box member, said canopy having an opening in its bottom adapted to be axially aligned with said hole; (c) means for releasably attaching said canopy relative to said mounting plate; (d) a bell-shaped cup member supported in said hole and depending therethrough; (e) universal joint means supporting and mounting said cup for universal movement in said hole of said box member, said universal joint means being below said plate; (f) a tubular stem depending from said cup member; (g) means connecting said stem to said cup member so as to leave the interior of said stem substantially unobstructed to the passage of electrical wires therethrough, and preventing substantial movement therebetween; (h) lamp socket means adapted to be attached to the lower end of said stem; (i) means for releasably attaching said lamp socket means to said stem; and (j) husk means adapted to enclose and cover said lamp socket means.

3. In a lighting fixture, the combination of: (a) a substantially flat mounting plate adapted to be attached relative to a ceiling; (b) a box member depending from said mounting plate and having a circular hole in the bottom thereof, said mounting plate and said box member providing a substantially continuous wall except for said hole; (c) a bell-shaped cup member supported in said hole and extending downwardly therethrough; (d) swivel means mounting said cup member in said box member to provide universal movement of said cup member relative to said box member, said swivel means having key means between said box member and said cup member for preventing relative rotation but permitting tilting therebetween; (e) a tubular stem rigidly secured to said cup member and depending therefrom; (f) lamp socket means; and (g) connecting means releasably secured to said lamp socket means and the lower end of said stem for rigidly securing the same together.

4. In a lighting fixture, the combination of: a substantially flat mounting plate adapted to be attached relative to a ceiling, said plate having a central opening therein and a depending wall secured to said mounting plate and extending downwardly from said opening, the lower end of said wall extending radially inwardly to form a circular opening concentric with and below said central opening of said mounting plate, said circular opening being smaller in diameter than said central opening and forming a seat; ball means seated on said seat and partially extending downwardly through said circular opening; hollow stem means depending from said ball means; means connecting said stem means to said ball means against substantial rotational and axial movement therebetween; lamp socket means connected to the lower end of said stem means; and keying means connecting said depending wall and said ball means for permitting tilting movement therebetween but preventing rotational movement therebetween.

5. A device as set forth in claim 4, including a bell-shaped canopy releasably secured to said mounting plate and depending therefrom so as to cover said plate and said depending wall.

References Cited in the file of this patent

UNITED STATES PATENTS

| | | |
|---|---|---|
| 1,297,211 | Magness | Mar. 11, 1919 |
| 1,555,821 | Benjamin | Oct. 6, 1925 |
| 1,639,125 | Benjamin | Aug. 16, 1927 |
| 2,147,284 | Doane | Feb. 14, 1939 |
| 2,186,751 | Chirelstein | Jan. 9, 1940 |
| 2,263,060 | Wideroe | Nov. 18, 1941 |
| 2,273,681 | Winkler et al. | Feb. 17, 1942 |
| 2,280,505 | Beck | Apr. 21, 1942 |